Patented Nov. 24, 1942

2,302,819

UNITED STATES PATENT OFFICE 2,302,819

N,N'-POLYMETHYLENE-BIS-O-HYDROXY-BENZAMIDE-MODIFIED POLYAMIDES

Gordon T. Vaala, Wilmington, Del., assignor to E. I. du Pont de Nemours & Company, Wilmington, Del., a corporation of Delaware No Drawing. Application January 24, 1940, Serial No. 315,421

8 Claims. (Cl. 260—2)

This invention relates to new compositions of matter, and more particularly to new bis-ortho-hydroxybenzamides. Still more particularly this invention relates to N,N'-polymethylene-bis-ortho-hydroxybenzamides of the general formula hereinafter set forth.

N,N'-methylene-bis-ortho-hydroxybenzamide itself is old, but it differs from all of the other members of this series in that its known manner of preparation is inapplicable to the aforesaid novel benzamides and, contrary to the polymethylene derivatives, it is not heat stable and will readily rearrange on heating, to form a resin. The polymethylene derivatives therefore possess properties which make them of much greater value than the said monomethylene compound.

This invention has an object the preparation of novel N,N'-polymethylene-bis-ortho-hydroxybenzamides. A further object is the admixture of N,N'-polymethylene-bis-ortho-hydroxybenzamides with synthetic linear polyamides. Still further objects will appear hereinafter.

The first of these objects is accomplished by reacting salicylic acid or an amide-forming derivative thereof with an aliphatic diamine containing at least two carbon atoms and preferably from two to twelve carbon atoms. The second of the said objects is accomplished by incorporating the new N,N'-polymethylene-bis-ortho-hydroxybenzamides with synthetic linear polyamides by methods such as are set forth hereinafter.

The residue of the salicylic acid or its amide-forming derivative used in carrying out the process for accomplishing the first object also may have alkyl or other substituents which do not interfere with the amide-forming reaction attached to the benzene rings. The N,N'-polymethylene-bis-ortho-hydroxybenzamides furthermore may be substituted on either one or both of the amide nitrogens with a substituent, said substituent being either an aliphatic or alicylic radical.

This new class of compounds can best be defined by the following formula:

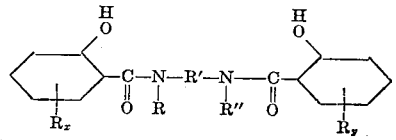

where R and R'' are hydrogen atoms or monovalent aliphatic radicals connected to nitrogen through carbon; R and R'' may be different or identical; R' is an aliphatic radical containing at least two, and preferably from two to twelve, carbon atoms, and which is attached to the nitrogens through carbon; and $R_x$ and $R_y$ are hydrogen atoms or alkyl substituents, and may be different or identical.

The new N,N'-polymethylene-bis-ortho-hydroxybenzamides are readily prepared by treating salicylic acid, a salicylic acid ester, salicyl chloride or salicylic anhydride with an aliphatic diamine, and if desired, purifying the final product by distillation under reduced pressure or by recrystallization from a suitable solvent. It is especially convenient to react a salicylic acid ester such as methyl salicylate with an aliphatic diamine to obtain an aliphatic bis-ortho-hydroxybenzamide.

This invention is described in more detail in the following examples, in which parts are by weight and tensile values are in pounds per square inch based on the original dimensions.

Example I

Salicyl chloride, prepared from 80 parts of salicylic acid, 92 parts of thionyl chloride and 0.2 part of aluminum chloride, according to the directions of Kupal (Ber. 63, 3190 (1930)), is dissolved in 140 parts of benzine, and to this a solution of 34 parts of hexamethylenediamine in 140 parts of benzine is slowly added. When addition is complete, the mixture is warmed on a steam bath until the benzine distills off. Purification yields 41 parts of N,N'-hexamethylene-bis-ortho hydroxybenzamide, melting at 139-140° C., corresponding to a yield of approximately 40% of the theoretical.

*Example II*

A mixture of 40 parts of hexamethylenediamine and 134 parts of methyl salicylate is warmed on a steam both for 12 hours. The methyl alcohol formed during the course of the reaction, and the excess methyl salicylate are removed by distillation under reduced pressure. The residue, consisting mainly of N,N'-hexamethylene-bis-ortho-hydroxybenzamide, is washed free of hexamethylenediamine and traces of the mono-ortho-hydroxybenzamide of hexamethylene diamine by shaking with 5% aqueous hydrochloric acid. Ninety-eight parts of the crude material, in yields approximating 80% of the theoretical, are obtained. Recrystallization from benzene yields a white crystalline product melting sharply at 142° C.

It is to be observed that the reaction illustrated in the foregoing examples not only yields products whose structural formulas conform to the type formula set out hereinabove, but that in such structural formulas R' has the same number and arrangement of carbon atoms as the diamine used in the reaction. Thus, if ethylenediamine, trimethylenediamine, tetramethylenediamine or pentamethylenediamine is used in the reaction, the number of carbon atoms in R' in each case is, respectively, 2, 3, 4 and 5; and they are arranged in straight-chain formation. Other diamines which can be used with analogous results are listed hereinbelow.

In general the new N,N'-polymethylene-bis-ortho-hydroxy-benzamides are moderately high melting, white crystalline solids. They are particularly useful in conjunction with the fiber-forming polymers known as synthetic linear superpolyamides, which are described in U. S. Patents 2,071,250, 2,071,253, 2,130,523 and 2,130,948. The said superpolyamides yield on acid hydrolysis diamines and dibasic acids, or amino acids, in the form of their respective salts, depending on the polyamide-forming materials from which the superpolyamides are derived. These superpolyamides as a class are strong, stable, fairly high melting compositions, and they can be formed into many useful objects such as tubes, rods, films, and the like by spinning, extruding or otherwise forming the objects from the molten polyamide. For many purposes, polyamides are sufficiently stable to ultraviolet light, heat, oxygen and moisture; but for certain uses, particularly for use in the form of sheets and films, the greater stability to ultraviolet light, heat, oxygen and moisture often is desired. The increasing uses to which polyamides have been put and the increasing number of desirable properties required of polyamides for most purposes have made the discovery of new and economical ultraviolet light, heat, oxygen and moisture stabilizers a matter of considerable importance to the art.

Many organic substances are known to be stable to ultra-violet light degradation and in many cases are known to impart such properties to resins or plastic compositions containing them. For example, ultraviolet light stabilizing action has been reported in U. S. 2,128,334 for the salt of salicylic acid and triethanolamine. Most of the compounds which are known to improve the ultraviolet light stability of plastic compositions, however, or to increase their resistance to aging, are unsuitable for use in polyamides because of insufficient heat stability, incompatibility or high volatility.

It has now been discovered that the novel N,N'-polymethylene - bis - ortho - hydroxybenzamides of this invention are especially effective in stabilizing synthetic linear polyamide compositions against degradation by ultraviolet light, heat, oxygen and moisture.

A very convenient method for incorporating the N,N'-polymethylene-bis-ortho-hydroxybenzamide in the polyamide consists in immersing the polyamide in filament or sheet form in a solution of the said benzamide in a non-solvent for the polyamide. Saturated solutions of the bis-ortho-hydroxybenzamide are especially useful. Under these conditions the bis-ortho-hydroxybenzamide is absorbed by the polyamide sheet. After the desired amount of bis-ortho-hydroxybenzamide has been absorbed by the polyamide, the sheet or filament is removed and dried.

Other methods of incorporating the bis-ortho-hydroxybenzamide also can be used. For example, the polyamide and bis-ortho-hydroxybenzamide can be dissolved in a mutual solvent and the solution used in making filaments, films, rods and the like either by evaporative or coagulative methods. The lower fatty acids, for example, formic acid, are useful solvents for this purpose. Phenols can also be used to advantage. Mixtures of chloroform and methanol are especially useful solvents for the polyamide interpolymers. In many cases, it is desirable that the polyamide composition be plasticized. The plasticizer can be incorporated into such compositions by any of the methods mentioned for incorporating a bis - ortho - hydroxybenzamide with a polyamide. Bis-ortho-hydroxybenzamides also may be incorporated by direct blending with the molten polymer or plasticized composition, or by milling.

For most purposes quantities of the N,N'-polymethylene- bis-ortho-hydroxybenzamide ranging from 0.1% to 25% by weight of the polyamide are used to greatest advantage, the amount used depending on the properties desired in the final product. When used in amounts from 5-25% by weight of the polyamide, the N,N'-polymethylene-bis-ortho-hydroxybenzamides have a plasticizing action and cause a lowering in the melting point of the product and in the case of the polyamide interpolymers, cause them to soften over a wider range. In the simple high melting polyamides the use of bis-ortho-hydroxybenzamides in amounts ranging from 0.1% to 25% does not interfere in any way with the process of cold drawing or cold working.

Examples illustrating the admixture of the new compounds with the aforesaid superpolyamides, and the advantageous properties of the resulting compositions, follow:

*Example III*

A polyamide interpolymer is prepared by heating 450 parts of hexamethylenediammonium adipate, 300 parts of epsiloncaprolactam, and 50 parts of water for one hour at 265-270° C. under the generated pressure (300#/sq. in.). The water is bled off and heating is continued for three hours under reduced pressure (100 mm.). The molten polymer is then extruded in ribbon form. It has an intrinsic viscosity of 1.25 and melts at 174–177° C.

Ten (10) parts of the aforesaid interpolymer, 9.5 parts of a mixture of N-ethyl-o- and p-toluenesulfonamide and 0.5 part of the N,N'-hexamethylene-bis-ortho-hydroxybenzamide are dissolved in 45 parts of chloroform and 12 parts of methanol by stirring at 60° C. for 2 hours. The solution is cooled to room temperature and a portion is poured onto a glass plate. By means of a leveling rod the solution is spread to an even layer and the solvent is allowed to evaporate in the open air. The final traces of solvent are removed from the film by aging at 65° C. for 15 hours. It melts at 143° C. when tested on a copper block in the open air.

The film thus prepared, together with a control film prepared in a similar manner and also containing 45% of a mixture of N-ethyl-o- and p-toluene sulfonamide, but no bis-ortho-hydroxybenzamide, was exposed for 20 hours to the light generated by a Cooper Hewitt mercury arc lamp operating under about 180 volts and about 4 amperes. The films were placed at a distance of 14 inches from the source of light. As illustrated in the following table, the film containing bis-ortho-hydroxybenzamide showed no loss in tensile or elongation and only a slight change in color, whereas the film containing no bis-ortho-hydroxybenzamide darkened to a yellowish-brown composition.

| Composition of film | Before exposure | | After exposure | | |
|---|---|---|---|---|---|
| | Tensile | Elongation | Tensile | Elongation | Color |
| Film #1 | Lbs./sq. in. 1,400 | Percent 200 | Lbs./sq. in. No loss in tensile strength. | Percent | Very light tan. |
| 50% hexamethylene adipamide-caprolactam interpolymer. | | | | | |
| 45% mixture of N-ethyl-ortho- and para-toluene-sulfonamide. | | | | | |
| 5% N,N'-hexamethylene-bis-ortho-hydroxybenzamide. | | | | | |
| Control (composition containing no stabilizer). | 1,500 | 188 | 890 | 36 | Dark brown. |
| 55% hexamethylene adipamide-caprolactam interpolymer. | | | | | |
| 45% mixture of N-ethyl-ortho- and para-toluenesulfonamide. | | | | | |

*Example IV*

Hexamethylene adipamide-caprolactam interpolymer is prepared as in Example III.

Ten (10) parts of the interpolymer, 9.5 parts of amyl-benzene-sulfonamide and 0.5 part of the N,N'-hexamethylene-bis-ortho-hydroxybenzamide are dissolved in a mixture of 80 parts of chloroform and 21 parts of methanol by stirring at 60° C. for 2 hours. The solution is cooled to room temperature and a portion is poured onto a glass plate at same temperature. The solution is spread to an even layer by means of a leveling blade and the solvent allowed to evaporate at room temperature. Last traces of solvent are removed by aging at 65° C. for 15 hours.

The film thus prepared and a control film prepared in a similar manner, also containing 50% amylbenzenesulfonamide, but no bis-ortho-hydroxybenzamide, were aged at 65° C. for 10.5 days and 7 days respectively. As illustrated in the following table, the film containing the bis-ortho-hydroxybenzamide showed no loss in tensile or elongation, whereas the film containing no bis-ortho-hydroxybenzamide showed a large reduction in elongation and tensile strength.

| Composition of film | Before aging | | After aging | |
|---|---|---|---|---|
| | Tensile | Elongation | Tensile | Elongation |
| Film #1 | Lbs./sq. in. 815 | Per cent 220 | Lbs./sq. in. No loss in tensile strength. | Per cent |
| 50% hexamethylene adipamide-caprolactam interpolymer. | | | | |
| 45% amylbenzenesulfonamide. | | | | |
| 5% N,N'-hexamethylene-bis-ortho-hydroxybenzamide. | | | | |
| Control (composition containing no stabilizer). | 1030 | 330 | 375 | 50 |
| 50% hexamethylene adipamide-caprolactam interpolymer. | | | | |
| 50% amylbenzenesulfonamide. | | | | |

*Example V*

A polyester-polyamide interpolymer is prepared by heating 265.6 parts of ethylene-glycol, 584.3 parts of adipic acid, and 146.9 parts of hexamethylenediammonium adipate at 155° C. under atmospheric pressure for 18 hours; at 200° C. under atmospheric pressure for 3 hours; at 200° C. under 20 mm. of mercury pressure for 2 hours, followed by 96 hours at 200° C. under 2–3 mm. pressure of mercury. All heatings are carried out in an atmosphere of carbon dioxide. The polymer has a melt viscosity of 1070 poises at 155° C. and melts at 96–105° C. One hundred fifty (150) parts of this interpolymer and 2 parts of N,N'-hexamethylene-bis-ortho-hydroxybenzamide are mill mixed in a conventional rubber mill and molded into films on a hot press at 105° C.

A film thus prepared together with a control film prepared in a similar manner but containing no N,N-hexamethylene-bis-ortho-hydroxybenzamide was exposed outdoors for 30 days on 45° south exposure racks. As illustrated in the following table, the film containing bis-ortho-hydroxybenzamide showed no loss in tensile or elongation, while the film containing no bis-ortho-hydroxybenzamide showed considerable reduction in both values.

| Composition of molded film | Before exposure | | After exposure | |
| --- | --- | --- | --- | --- |
| | Tensile | Elongation | Tensile | Elongation |
| | Lbs./sq. in. | Per cent | Lbs./sq. in. | Per cent |
| Film #1 98.5% hexamethylene adipamide-ethylene glycol adipate interpolymer. 1.5% N,N'-hexamethylene-bis-ortho-hydroxybenzamide. | 1570 | 585 | No loss in tensile strength. | |
| Control (composition containing no stabilizer) 100% hexamethylene adipamide-ethylene glycol adipate interpolymer. | 2050 | 770 | 1050 | 430 |

It is to be understood that the aforementioned examples are merely illustrative. As additional illustrations of N,N'-polymethylene-bis-ortho-hydroxybenzamides which may be used to improve the resistance of polyamides and other compositions of matter to degradation by heat and light may be mentioned the following:

N,N'-ethylene-bis-ortho-hydroxybenzamide, N,N'-trimethylene-bis-ortho-hydroxybenzamide, N,N'-tetramethylene-bis-ortho-hydroxybenzamide, N,N'-pentamethylene-bis-ortho-hydroxybenzamide, N,N'-heptamethylene-bis-ortho-hydroxybenzamide, N,N'-octamethylene-bis-ortho-hydroxybenzamide, N,N'-decamethylene-bis-ortho-hydroxybenzamide, and N,N'-dodecamethylene-bis-ortho-hydroxybenzamide. Also suitable are the bis-ortho-hydroxybenzamides obtained by the reaction of salicylic acid or its amide-forming derivatives with 1,2-diaminopropane, 1,2-diaminobutane, 1,3-diaminobutane, the cyclohexane diamines, piperazine, 3-methylhexamethylenediamine, N,N'-dimethylhexamethylenediamine, N,N'-diethylhexamethylenediamine, N,N'-diethylethylenediamine, N,N'-dimethyl-trimethylenediamine, N,N'-diethylpentamethylenediamine, N,N'-dimethyl-octamethylenediamine, N,N'-diethyl-decamethylenediamine, 1,12-diamine-octadecane, N,N'-dimethyldodecamethylenediamine, N,N'-dipropyl-1,3-diaminobutane, N,N'-dimethyl-cyclohexane diamines, N,N'-dibutyl-3-methylhexamethylenediamine, N,N'-diamyl-pentamethylenediamine, N,N'-dibutyl-tetramethylenediamine, N,N'-diamyl-trimethylenediamine, N-butyl-hexamethylenediamine, N-propyl-trimethylenediamine and N-amyl-tetramethylenediamine. Also suitable are the bis-ortho-hydroxybenzamides prepared from butyl-salicylic acid and hexamethylenediamine, amylsalicylic acid and pentamethylenediamine, octylsalicyclic acid and ethylenediamine, and propylsalicyclic acid and decamethylenediamine.

The use of N,N'-polymethylene-bis-ortho-hydroxybenzamides as stabilizing agents towards light, heat, oxygen and moisture, is not confined to polyamides alone. That is, the compositions also may contain plasticizers as modifying agents, such as sulfonamides, phenols, esters, ether esters, and the like, or other types of modifying agents, for example, luster modifying agents, pigments, dyes, antioxidants, oils, antiseptics, cellulose derivatives, resins, fillers, and so forth.

As examples of synthetic linear superpolymers which can be stabilized by the addition of N,N'-polymethylene-bis-ortho-hydroxybenzamides may be mentioned polytetramethylene sebacamide, polypentamethylene adipamide, polypentamethylene sebacamide, polyhexamethylene-suberamide, polyhexamethylene sebacamide, polyoctamethylene adipamide, polydecamethylene carbamide, poly-p-xylylene sebacamide, poly-phenylene diacetamide, and the polyamide derived from 3,3'-diaminodipropyl ether and adipic acid. Polymerized 6-aminocaproic acid, polymerized 9-aminononanoic acid, and polymerized 11-aminoundecanoic acid are additional examples of linear superpolymers which may be used. Obviously, the invention also is applicable to mixtures of polyamides. In general, the synthetic linear superpolymers do not possess fiber-forming properties unless they have an intrinsic viscosity above 0.5, as defined in U. S. 2,130,948. Likewise, to be useful in making films, ribbons, tubes, rods, or the like, the polyamide should have an intrinsic viscosity above 0.4 and preferably above 0.6.

Instead of the polyamides mentioned above, which are obtainable from bifunctional polyamide-forming reactants as essentially sole reactants, I may use the linear superpolymers obtained by including with the polyamide-forming reactants used to prepare the polyamide other bifunctional reactants such as glycols and hydroxy acids. As examples of such modified polyamides may be mentioned those derived from diamines, dibasic acids, and glycols; those derived from amino acids, dibasic acids, and glycols; and those derived from amino acids and hydroxy acids. Although these products contain ester linkages, they still may be referred to as polyamides, since they contain a plurality of amide linkages and retain many of the desirable properties of the simple polyamides. Like the simple polyamides these modified polyamides do not exhibit fiber-forming properties until their intrinsic viscosity is at least 0.4.

Superpolymers stabilized with N,N'-polymethylene-bis-ortho-hydroxybenzamides, are useful in many forms and for many purposes. Typical applications for compositions stabilized with N,N'-polymethylene-bis-ortho-hydroxybenzamides are yarns, fabrics, bristles, fishing leaders, fishlines, rods, tubes, films, ribbons, sheets, safety glass interlayers, molded articles and coating compositions. Improvement in the resistance of polyamide films to degradation on direct exposure to the sun and elements is very important. Films containing no stabilizer tend to weaken and darken on long exposure, whereas the addition of small amounts of N,N'-polymethylene-bis-ortho-hydroxybenzamide increases considerably the usefulness of such compositions.

N,N'-polymethylene-bis-ortho-hydroxybenzamamides also are useful in preventing or retarding discoloration and degradation in molded articles, the life of yarns and filaments, for example, being lengthened by the use of small amounts of these stabilizers. N,N'-polymethylene-bis-ortho-hydroxybenzamides are useful, furthermore, as stabilizers for plasticizers, resins and other polymeric compositions of matter, and as fungicides, pharmaceuticals, and dye intermediates.

As many apparently widely different embodiments of this invention may be made without departing from the spirit and scope thereof, it is to be understood that I do not limit myself to the specific embodiments thereof except as defined in the appended claims.

I claim:

1. A composition of matter comprising a polymeric synthetic linear polyamide having an intrinsic viscosity of at least 0.4 and being the reaction product of a polymer-forming composition comprising reacting materials selected from the class consisting of (a) polymerizable monoaminomonocarboxylic acids, and (b) mixtures of diamines and dibasic carboxylic acids, and a N,N'-polymethylene-bis-ortho-hydroxybenzamide, the latter being devoid of aromatic substituents on its amide nitrogens.

2. The process of treating a polymeric synthetic linear polyamide having an intrinsic viscosity of at least 0.4 and being the reaction product of a polymer-forming composition comprising reacting materials selected from the class consisting of (a) polymerizable monoaminomonocarboxylic acids, and (b) mixtures of diamines and dibasic carboxylic acids, which comprises combining with the said polyamide a N,N'-polymethylene-bis-ortho-hydroxybenzamide, the same being devoid of aromatic substituents on its amide nitrogens.

3. A polymeric synthetic linear polyamide normally tending to deteriorate when subjected to protracted action of ultraviolet light, heat, oxygen and moisture, containing a N,N'-polymethylene-bis-ortho-hydroxybenzamide in sufficient amount to retard such deterioration, the said N,N'-polymethylene-bis-ortho-hydroxybenzamide being devoid of aromatic substituents on its amide nitrogens, and the said polymeric synthetic linear polyamide having an intrinsic viscosity of at least 0.4 and being the reaction product of a polymer-forming composition comprising reacting materials selected from the class consisting of (a) polymerizable monoaminomonocarboxylic acids, and (b) mixtures of diamines and dibasic carboxylic acids.

4. A polymeric synthetic linear polyamide composition of increased stability toward ultraviolet light, heat, oxygen and moisture, comprising a synthetic linear polyamide of high molecular weight and a small quantity of N,N'-hexamethylene-bis-ortho-hydroxybenzamide, the said polymeric synthetic linear polyamide having an intrinsic viscosity of at least 0.4 and being the reaction product of polymer-forming composition comprising reacting materials selected from the class consisting of (a) polymerizable monoaminomonocarboxylic acids, and (b) mixtures of diamines and dibasic carboxylic acids.

5. The method of incorporating a N,N'-polymethylene-bis-ortho-hydroxybenzamide which is devoid of aromatic substituents on its amide nitrogens, with a polymeric synthetic linear polyamide having an intrinsic viscosity of at least 0.4 and being the reaction product of a polymer-forming composition comprising reacting materials selected from the class consisting of (a) polymerizable monoaminomonocarboxylic acids, and (b) mixtures of diamines and dibasic carboxylic acids, which method comprises immersing the said polyamide, in the form of a shaped solid, into a dilute solution of the said N,N'-polymethylene-bis-ortho-hydroxybenzamide in a non-solvent for the said polyamide.

6. The method of incorporating a N,N'-polymethylene-bis-ortho-hydroxybenzamide, the same being devoid of an aromatic substituent on its amide nitrogen, with a polymeric synthetic linear polyamide having an intrinsic viscosity of at least 0.4 and being the reaction product of a polymer-forming composition comprising reacting materials selected from the class consisting of (a) polymerizable monoaminomonocarboxylic acids, and (b) mixtures of diamines and dibasic carboxylic acids, which method comprises mixing the said polyamide and the said N,N'-polymethylene-bis-ortho-hydroxybenzamide together at an elevated temperature.

7. A composition of matter comprising a polymeric synthetic linear polyamide having an intrinic viscosity of at least 0.4 and being the reaction product of a polymer-forming composition comprising reacting materials selected from the class consisting of (a) polymerizable monoaminomonocarboxylic acids, and (b) mixtures of diamines and dibasic carboxylic acids, and a compound in which two o-hydroxybenzamide groups devoid of an aromatic substituent on the nitrogen are linked together through the amide nitrogens by a bivalent aliphatic radical having at least two carbon atoms and having terminal methylene groups.

8. A composition of matter comprising a polymeric synthetic linear polyamide having an intrinsic viscosity of at least 0.4 and being the reaction product of a polymer-forming composition comprising reacting materials selected from the class consisting of (a) polymerizable monoaminomonocarboxylic acids, and (b) mixtures of diamines and dibasic carboxylic acids, and a compound in which two o-hydroxybenzamide groups devoid of an aromatic substituent on the nitrogen are linked together through the amide nitrogens by a bivalent aliphatic radical having chain of 2-12 carbon atoms and having terminal methylene groups attached respectively to the said nitrogens.

GORDON T. VAALA.

CERTIFICATE OF CORRECTION.

Patent No. 2,302,819.                               November 24, 1942.

GORDON T. VAALA.

It is hereby certified that error appears in the printed specification of the above numbered patent requiring correction as follows: Page 1, first column, line 17, for "has an" read --has as an--; page 2, first column, line 11, for "both" read --bath--; page 4, first column, line 8, for "N,N-hexamethylene-bis-ortho-hydroxybenzamide" read --N,N'-hexamethylene-bis-ortho-hydroxybenzamide; and second column, line 41, for "0.5" read --0.4--; and that the said Letters Patent should be read with this correction therein that the same may conform to the record of the case in the Patent Office.

Signed and sealed this 26th day of January, A. D. 1943.

Henry Van Arsdale,
(Seal)                    Acting Commissioner of Patents.